H. R. FREITAG, C. HINTZ, Jr., AND A. HINTZ.
DIRIGIBLE HEADLIGHT.
APPLICATION FILED JULY 14, 1920.
1,388,108.
Patented Aug. 16, 1921.
2 SHEETS—SHEET 2.
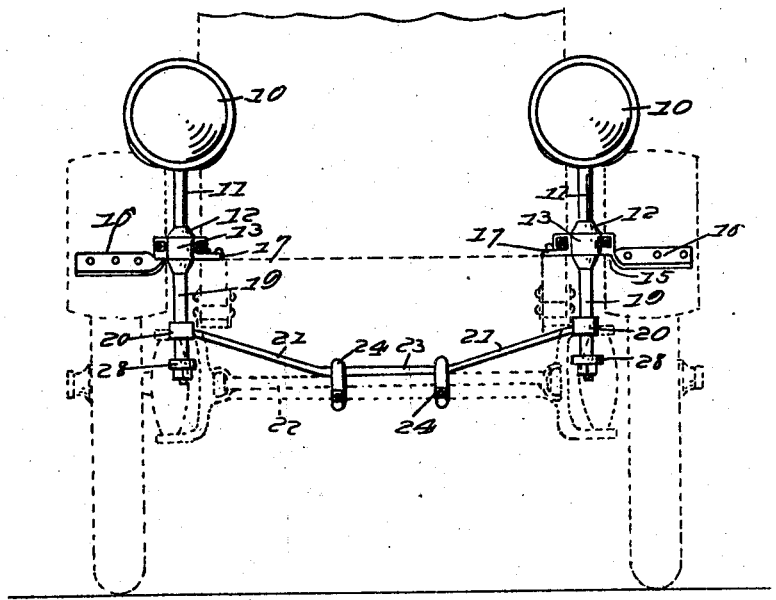
Fig. 3.
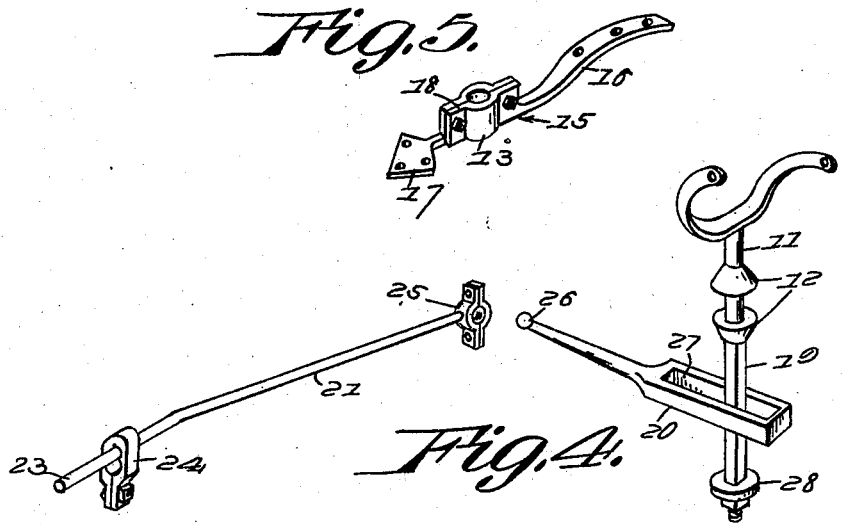
Fig. 5.
Fig. 4.

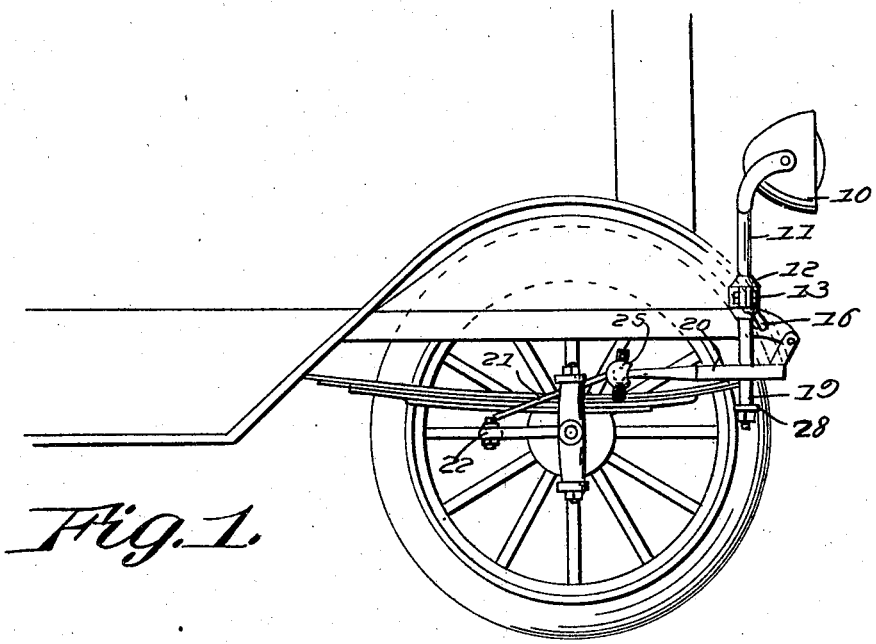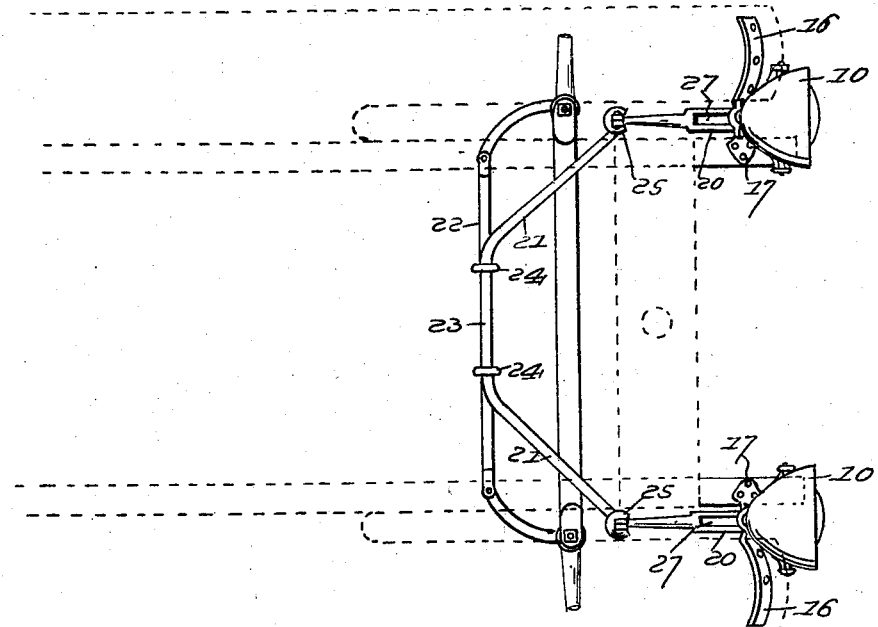

UNITED STATES PATENT OFFICE.

HERBERT R. FREITAG, CHRISTIAN HINTZ, JR., AND ANDREW HINTZ, OF MAX, NORTH DAKOTA.

DIRIGIBLE HEADLIGHT.

1,388,108.  Specification of Letters Patent.  Patented Aug. 16, 1921.

Application filed July 14, 1920. Serial No. 396,312.

*To all whom it may concern:*

Be it known that we, HERBERT R. FREITAG, CHRISTIAN HINTZ, Jr., and ANDREW HINTZ, citizens of the United States of America, residing at Max, in the county of McLean and State of North Dakota, have invented new and useful Improvements in Dirigible Headlights, of which the following is a specification.

The object of the invention is to provide a simple and relatively inexpensive dirigible headlight mechanism which may be readily applied as an attachment to an automobile of any of the standard types for actuation by the spindle connecting rod of the machine for directing the headlight in the path of the vehicle in making turns without interfering with the vertical movement of the body of the car with relation to the running gear, or chassis and without obstructing the turning movement or limiting the freedom thereof, and with this object in view, the invention consists in a construction and combination of parts, of which a preferred embodiment is shown in the accompanying drawing, wherein :—

Figure 1, is a side view of a dirigible headlight apparatus embodying the invention applied in operative position to a vehicle.

Fig. 2, is a plan view of the same.

Fig. 3, is a detail front view of the attachment showing the portions of the vehicle body in dotted lines.

Fig. 4 is a collective perspective view of the lamp stem and operating means therefor.

Fig. 5 is a perspective view of the stem bearing.

The headlight casing 10 which may be of any preferred form or type is supported by a stem 11 having a bearing portion 12 adapted to be mounted in a bearing 13 formed in a bracket 15 which is designed for attachment to the wheel guard by an arm 16 and any suitable portion of the frame of the car by a foot 17, said bearing 13 having a removable cap plate 18 to facilitate the connection of the parts.

The stem of the headlight casing is extended below the bearing to form a cross sectionally angular portion 19 with which is engaged the slotted extremity of a lever 20 connected with the arm 21 attached to the spindle connecting rod 22. Preferably the apparatus is constructed to operate both of the side headlights of a vehicle in which case the arm 21 is deflected as shown in the drawing and is formed as a part of the bar 23 secured by clips 24 to the spindle connecting rod, and the free ends of the bar which is disposed in an inwardly and laterally transverse relation with the spindle connecting rod terminate in sockets 25 for the reception of balls 26 on the rear end of the levers 20.

The lever is longitudinally slotted as indicated at 27 to engage the squared or cross sectionally angular portion of the stem 11 and accidental disengagement of the said lever from the stem is prevented by the stop washer 28 or the equivalent thereof secured to the stem and their relation is such as to permit of relatively parallel movements of the stem and lever and also forward and rearward movement of the arm 21 with the spindle connecting rod and with relation to the stem, so that while turning movement may be communicated from the connecting rod through the engaged connections of the lamp casing and stem, the freedom of relative movement in other directions is unobstructed and the strain on the parts incident to the movement of the body of the vehicle with relation to the running gear or chassis is avoided.

The invention having been described, what is claimed as new and useful is :—

The combination with an auto vehicle having a spindle connecting rod, of a headlight provided with a stem and a bearing in which the stem is angularly movable, the stem being projected below the bearing and made cross-sectionally angular on said lower projecting end, a lever longitudinally slotted adjacent one extremity, the angular portion of the stem projecting through said slot, the remaining extremity of the lever being formed with a ball, a bar having its intermediate portion disposed in substantial parallelism with the spindle connecting rod, and clamps securing said bar to the spindle connecting rod at spaced points, the bar being deflected to provide an upward forwardly extending arm provided at its extremity with a socket in which the ball of said lever engages to provide a universal connection between the two.

In testimony whereof we affix our signatures.

HERBERT R. FREITAG.
CHRISTIAN HINTZ, JR.
ANDREW HINTZ.